(12) United States Patent
Gupta

(10) Patent No.: US 10,587,561 B2
(45) Date of Patent: Mar. 10, 2020

(54) METHOD AND SYSTEM FOR OPTIMIZING AND PREVENTING FAILURE OF SENDER POLICY FRAMEWORK (SPF) LOOKUPS BY DYNAMICALLY GENERATING AND RETURNING FLATTENED SPF RECORDS

(71) Applicant: Amit Gupta, San Francisco, CA (US)

(72) Inventor: Amit Gupta, San Francisco, CA (US)

( * ) Notice: Subject to any disclaimer, the term of this patent is extended or adjusted under 35 U.S.C. 154(b) by 123 days.

(21) Appl. No.: 15/892,206

(22) Filed: Feb. 8, 2018

(65) Prior Publication Data
US 2018/0227259 A1 Aug. 9, 2018

Related U.S. Application Data

(60) Provisional application No. 62/457,010, filed on Feb. 9, 2017.

(51) Int. Cl.
*H04L 12/58* (2006.01)
*H04L 29/08* (2006.01)
*G06F 16/2455* (2019.01)

(52) U.S. Cl.
CPC ........ *H04L 51/28* (2013.01); *G06F 16/24566* (2019.01); *H04L 51/12* (2013.01); *H04L 51/30* (2013.01); *H04L 67/28* (2013.01)

(58) Field of Classification Search
CPC ......... H04L 51/12; H04L 51/04; H04L 51/28; H04L 51/30; H04L 61/1511; H04L 61/305; H04L 67/28; H04L 67/2833; G06F 16/24566
See application file for complete search history.

(56) References Cited

U.S. PATENT DOCUMENTS

| | | | |
|---|---|---|---|
| 2002/0112171 A1* | 8/2002 | Ginter | G06F 21/10 713/185 |
| 2010/0011420 A1* | 1/2010 | Drako | G06Q 10/107 726/5 |
| 2012/0215892 A1* | 8/2012 | Wanser | H04L 61/1511 709/222 |
| 2016/0315969 A1* | 10/2016 | Goldstein | G06F 21/6218 |

* cited by examiner

*Primary Examiner* — Joe Chacko
(74) *Attorney, Agent, or Firm* — White-Welker & Welker, LLC; Matthew T. Welker, Esq.

(57) ABSTRACT

A method for optimizing and preventing failure of Sender Policy Framework (SPF) lookups by dynamically generating and returning flattened SPF records, recorded on computer-readable medium and capable of execution by a computer, the method comprising the steps of: requesting a regular SPF Record; receiving a SPF Record that includes an entry that points to a Proxy Server; the SPF Proxy server looking up a canonical SPF record optionally containing many included domains; and the SPF Proxy server flattening the canonical record into IP addresses and optionally sub records depending on the length of the flattened response.

10 Claims, 1 Drawing Sheet

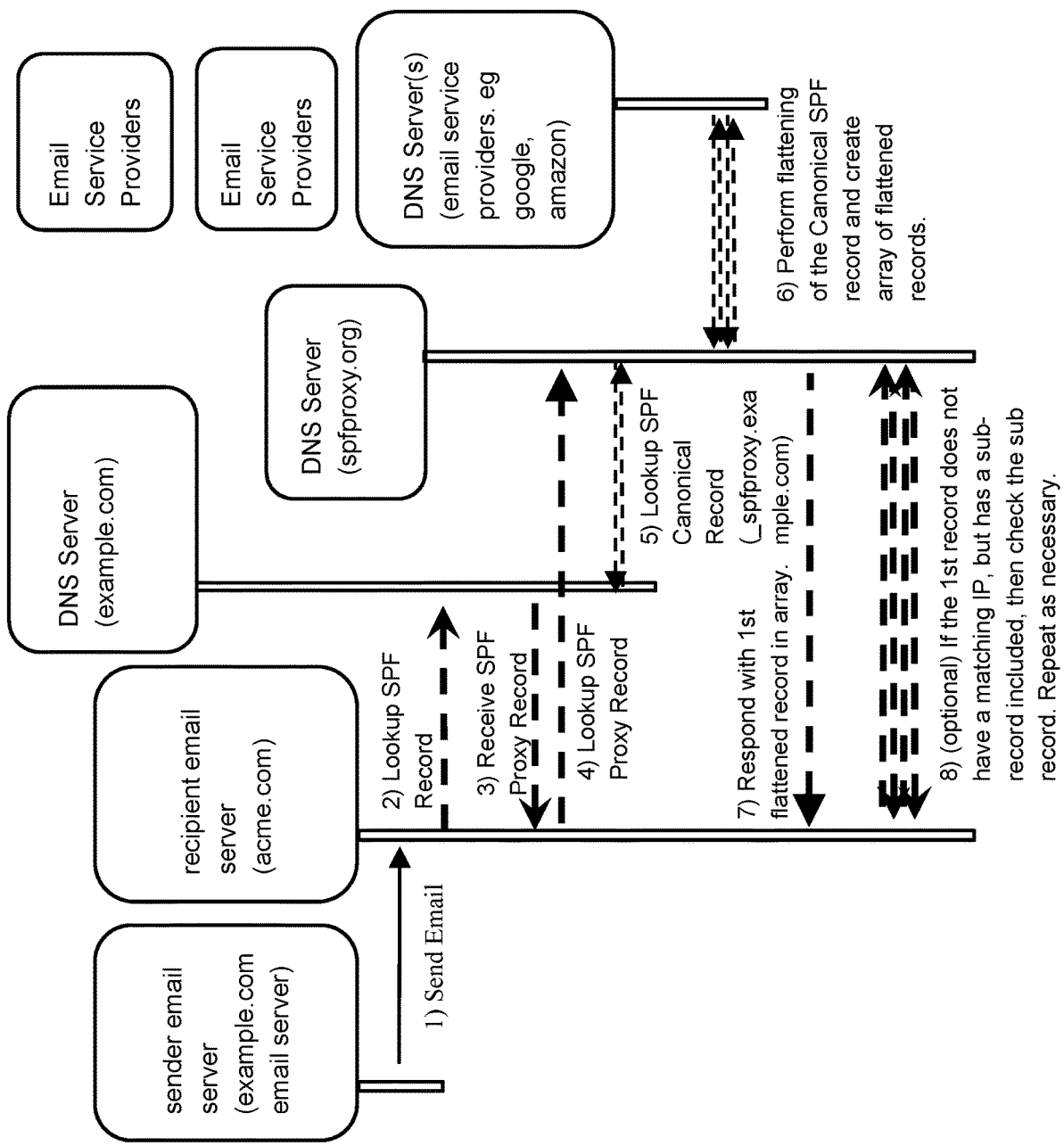

METHOD AND SYSTEM FOR OPTIMIZING AND PREVENTING FAILURE OF SENDER POLICY FRAMEWORK (SPF) LOOKUPS BY DYNAMICALLY GENERATING AND RETURNING FLATTENED SPF RECORDS

CROSS REFERENCE TO RELATED APPLICATIONS

This application claims priority from U.S. Patent Application Ser. No. 62/457,010, entitled "Method and system for optimizing and preventing failure of Sender Policy Framework (SPF) lookups by dynamically generating and returning flattened SPF records", filed on Feb. 9, 2017. The benefit under 35 USC § 119(e) of the United States provisional application is hereby claimed, and the aforementioned application is hereby incorporated herein by reference.

This application is related to U.S. Provisional patent application Ser. No. 15/275,744, entitled "Method and System for Optimizing and Preventing Failure of Sender Policy Framework (SPF) Lookups", filed on Sep. 26, 2015 which claims priority from U.S. Provisional Patent Application Ser. No.62/232,566.

This application is related to U.S. Provisional Patent Application Ser. No. 62/232,566, entitled "Method and System for Optimizing and Preventing Failure of Sender Policy Framework (SPF) Lookups", filed on Sep. 25, 2015.

FEDERALLY SPONSORED RESEARCH

Not Applicable

SEQUENCE LISTING OR PROGRAM

Not Applicable

TECHNICAL FIELD OF THE INVENTION

The present invention relates generally to email applications. More specifically, the present invention relates to overcoming current DNS lookup limitations which commonly cause SPF email authentication problems for legitimate senders. This method does not utilize Sender Policy Framework (SPF) Macro records as other inventions claim to use.

BACKGROUND OF THE INVENTION

Sender Policy Framework (SPF) is a system implemented by most email service providers that helps to reduce Electronic Mail (email) "spam" that is forged by a malicious system or entity. At a high level, SPF allows an administrator for a DNS domain (eg: example.com) to authorize a set of servers to send email on behalf of the domain. The authorization is most commonly based on the Internet Protocol (IP) address of the server that is sending the email. Full details of the SPF process can be found in RFC 4408 (https://tools.ietf.org/html/rfc4408) and RFC 7208 (https://tools.ietforg/html/rfc7208).

As more companies outsource email related functionality to 3rd party providers, it is important for the administrators for these companies to authorize the 3rd parties to send email on their behalf. For example, a company may want a bulk mail service provider such as MAILCHIMP to send email on the company's behalf. To do this, the company will "include" an SPF record from MAILCHIMP or any other service provider they use.

For example, the following record will authorized Google and Mailchimp to send email on behalf of example.com. example.com 60 IN TXT "v=spf1 include:_spf.google.com include:spf.mailchimp.com ~all"

Each included record is recursively searched for more records until they all are resolved to specific IP address ranges. This recursive lookup can cause problems, and is the subject of the invention presented in this patent filing. The SPF RFCs define a hard limit of 10 recursive lookups, after which, an SPF check will fail. A failed SPF check can have a detrimental effect on deliverability of email and cause messages to be outright rejected or placed into a junk mail folder.

DEFINITIONS

Unless stated to the contrary, for the purposes of the present disclosure, the following terms shall have the following definitions:

"Application software" is a set of one or more programs designed to carry out operations for a specific application. Application software cannot run on itself but is dependent on system software to execute. Examples of application software include MS Word, MS Excel, a console game, a library management system, a spreadsheet system etc. The term is used to distinguish such software from another type of computer program referred to as system software, which manages and integrates a computer's capabilities but does not directly perform tasks that benefit the user. The system software serves the application, which in turn serves the user.

The term "app" is a shortening of the term "application software". It has become very popular and in 2010 was listed as "Word of the Year" by the American Dialect Society "Apps" are usually available through application distribution platforms, which began appearing in 2008 and are typically operated by the owner of the mobile operating system. Some apps are free, while others must be bought. Usually, they are downloaded from the platform to a target device, but sometimes they can be downloaded to laptops or desktop computers.

"API" In computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising each other.

The Domain Name System (DNS) is a hierarchical distributed naming system for computers, services, or any resource connected to the Internet or a private network. It associates various information with domain names assigned to each of the participating entities. Most prominently, it translates domain names, which can be easily memorized by humans, to the numerical IP addresses needed for the purpose of computer services and devices worldwide. The Domain Name System is an essential component of the functionality of most Internet services because it is the Internet's primary directory service.

"Email" or "electronic messages" is defined as a means or system for transmitting messages electronically as between computers or mobile electronic devices on a network.

"Email Client" or more formally mail user agent (MUA) is a computer program used to access and manage a user's email. A web application that provides message management, composition, and reception functions is sometimes also considered an email client, but more commonly referred to as webmail.

"GUI". In computing, a graphical user interface (GUI) sometimes pronounced "gooey" (or "gee-you-eye")) is a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces (CLIs), which require commands to be typed on the keyboard.

The Hypertext Transfer Protocol (HTTP) is an application protocol for distributed, collaborative, hypermedia information systems. [1] HTTP is the foundation of data communication for the World Wide Web. Hypertext is structured text that uses logical links (hyperlinks) between nodes containing text. HTTP is the protocol to exchange or transfer hypertext.

The Internet Protocol (IP) is the principal communications protocol in the Internet protocol suite for relaying datagrams across network boundaries. Its routing function enables internetworking, and essentially establishes the Internet.

An Internet Protocol address (IP address) is a numerical label assigned to each device (e.g., computer, printer) participating in a computer network that uses the Internet Protocol for communication. An IP address serves two principal functions: host or network interface identification and location addressing.

An Internet service provider (ISP) is an organization that provides services for accessing, using, or participating in the Internet.

A "mobile app" is a computer program designed to run on smartphones, tablet computers and other mobile devices, which the Applicant/Inventor refers to generically as "a computing device", which is not intended to be all inclusive of all computers and mobile devices that are capable of executing software applications.

A "mobile device" is a generic term used to refer to a variety of devices that allow people to access data and information from where ever they are. This includes cell phones and other portable devices such as, but not limited to, PDAs, Pads, smartphones, and laptop computers.

A "module" in software is a part of a program. Programs are composed of one or more independently developed modules that are not combined until the program is linked. A single module can contain one or several routines or steps.

A "module" in hardware, is a self-contained component.\

Resource records (RRs) are the data records permissible in zone files of the Domain Name System (DNS).

Simple Mail Transfer Protocol (SMTP) is an Internet standard for electronic mail (email) transmission.

"SMTP Relay", which stands for Simple Mail Transfer Protocol, lets you send email messages through your email account using your existing email service.

"SPF" is the abbreviation for Sender Policy Framework.

"SPF record". For the purposes of this document, an SPF record refers to either a standard DNS TXT resource record or SPF resource record.

A "software application" is a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

A "software module" is a file that contains instructions. "Module" implies a single executable file that is only a part of the application, such as a DLL. When referring to an entire program, the terms "application" and "software program" are typically used. A software module is defined as a series of process steps stored in an electronic memory of an electronic device and executed by the processor of an electronic device such as a computer, pad, smart phone, or other equivalent device known in the prior art.

A "software application module" is a program or group of programs designed for end users that contains one or more files that contains instructions to be executed by a computer or other equivalent device.

Spam or SPAM commonly refers to: Spamming, unsolicited or undesired electronic messages; Email spam, unsolicited, undesired, or illegal email messages; spam messages, unsolicited, undesired, or illegal messages in general (private messages on websites, sms, messenger etc.

A "computer system" or "system" consists of hardware components that have been carefully chosen so that they work well together and software components or programs that run in the computer. The main software component is itself an operating system that manages and provides services to other programs that can be run in the computer. The complete computer made up of the CPU, memory and related electronics (main cabinet), all the peripheral devices connected to it and its operating system. Computer systems fall into two categories: clients and servers.

URL is an abbreviation of Uniform Resource Locator (URL), it is the global address of documents and other resources on the World Wide Web (also referred to as the "Internet").

A "User" is any person registered to use the computer system executing the method of the present invention.

In computing, a "user agent" or "useragent" is software (a software agent) that is acting on behalf of a user. For example, an email reader is a mail user agent, and in the Session Initiation Protocol (SIP), the term user agent refers to both end points of a communications session. In many cases, a user agent acts as a client in a network protocol used in communications within a client-server distributed computing system. In particular, the Hypertext Transfer Protocol (HTTP) identifies the client software originating the request, using a "User-Agent" header, even when the client is not operated by a user. The SIP protocol (based on HTTP) followed this usage.

A "web application" or "web app" is any application software that runs in a web browser and is created in a browser-supported programming language (such as the combination of JavaScript, HTML and CSS) and relies on a web browser to render the application.

A "website", also written as Web site, web site, or simply site, is a collection of related web pages containing images, videos or other digital assets. A website is hosted on at least one web server, accessible via a network such as the Internet or a private local area network through an Internet address known as a Uniform Resource Locator (URL). All publicly accessible websites collectively constitute the World Wide Web.

A "web page", also written as webpage is a document, typically written in plain text interspersed with formatting instructions of Hypertext Markup Language (HTML, XHTML). A web page may incorporate elements from other websites with suitable markup anchors.

Web pages are accessed and transported with the Hypertext Transfer Protocol (HTTP), which may optionally employ encryption (HTTP Secure, HTTPS) to provide security and privacy for the user of the web page content. The user's application, often a web browser displayed on a computer, renders the page content according to its HTML markup instructions onto a display terminal. The pages of a website can usually be accessed from a simple Uniform Resource Locator (URL) called the homepage. The URLs of the pages organize them into a hierarchy, although hyperlinking between them conveys the reader's perceived site structure and guides the reader's navigation of the site.

SUMMARY OF THE INVENTION

The present invention provides a novel method to overcome current DNS lookup limitations which commonly cause SPF email authentication problems for legitimate senders. This method does not utilize SPF Macro records as other inventions claim to use.

BRIEF DESCRIPTION OF THE DRAWINGS

The accompanying drawings, which are incorporated herein form a part of the specification, illustrate the present invention and, together with the description, further serve to explain the principles of the invention and to enable a person skilled in the pertinent art to make and use the invention.

FIG. 1 is a flow chart illustrating the process/method for optimizing and preventing failure of sender policy framework (SPF) lookups.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the present invention.

The present invention provides a novel method to overcome current DNS lookup limitations which commonly cause SPF email authentication problems for legitimate senders. This method does not utilize SPF Macro records as other inventions claim to use.

One current method to address the lookup limit is "flatten" the existing record by performing all the DNS lookups, and constructing an SPF record that just contains IP addresses. Flattening a record may end up creating 1 or more SPF records depending on how many IP addresses are discovered. If the number of IPs causes the size of the SPF record to exceed a certain threshold, then the record is usually split and a sub-record is creating. While this sub-record causes an additional DNS lookup, it presumably will remove many lookups. It's still theoretically possible to exceed the 10 DNS limit lookup threshold if an extraordinary number of IP addresses are needed, but in most cases the flattening should address the problem.

The present invention taught here circumvents the lookup limit by allowing the administrator of example.com to create a secondary SPF record such as_spfproxy.example.com that includes all the desired SPF records even if it exceeds the 10 recursive lookups. The administrator would then then create or modify their main SPF record for example.com to include an entry that points to the SPF Proxy which is the subject of this invention.

The flow can be described in the following diagram of FIG. 1. First an email is sent from a mail server that purports to be from adam@example.com to eve@acme.com 1. The email can be sent from adam@example.com's corporate email servers or from a variety of 3rd party email providers. Next, acme.com's email server attempts to do an SPF validation using example.com's SPF record 2. Acme.com's email server does a DNS request for TXT example.com. In a third step 3, example.com's DNS service responds with an SPF Proxy Record, eg: "v=spf1 include:example.com._d.spfproxy.org ~all". This proxy record does not require an SPF Macro which the subject of a number of other inventions.

In a fourth step 4, acme.com's email server makes a request for the included example.com._d.spfproxy.org record. Spfproxy.org receives the request and extracts the domain name (example.com) and optional sub record identifiers. Spfproxy.org looks up the Canonical SPF Record from example.com's DNS server by making a request for _spfproxy.example.com 5, eg: "v=spf1 include:_spf.google.com include:spf.mailchimp.com ~all". The canonical record can be determined by an optional or required "selector" contained within the Proxy Record. This will allow the SPF Proxy service to use <selector>.example.com instead of hardcoding _spfproxy.example.com.

Spfproxy.org now flattens the canonical SPF record down into ip address and optional sub address and responds with the flattened records 6, eg: "v=spf1 ip4:1.2.3.4 include:_s0 .example.com._d.spfproxy.org ~all". Here the domain is example.com and the subrecord is _s0 . There can be more subrecords such as _s1,_s2, etc. DNS Server (spfproxy.org) responds with 1st flattened record in array 7.

Next acme.com optionally makes a request for a subrecord such as _s0 .example.com._d.spfproxy.org if the IP address of the sending email server is not in the list of flattened IP blocks that have been returned to that point 8.

All DNS entries, IP address, and hostnames are listed here for example purposes only and can vary in implementation scenarios.

The system is set to run on a computing device or mobile electronic device. A computing device or mobile electronic device on which the present invention can run would be comprised of a CPU, Hard Disk Drive, Keyboard, Monitor, CPU Main Memory and a portion of main memory where the system resides and executes. Any general-purpose computer, smartphone, or other mobile electronic device with an appropriate amount of storage space is suitable for this purpose. Computer and mobile electronic devices like these are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A method for optimizing and preventing failure of Sender Policy Framework (SPF) lookups by dynamically generating and returning flattened SPF records, recorded on computer-readable medium and capable of execution by a computer, the method comprising the steps of:
    requesting a regular SPF Record;
    receiving a SPF Record that includes an entry that points to a Proxy Server (SPF Proxy Record);
    the SPF Proxy server looking up a canonical SPF record optionally containing many included domains, wherein a lookup limit is circumvented by allowing the administrator of the sending email server to create a secondary SPF record that includes all the desired SPF records even if it exceeds 10 recursive lookups; and
    the SPF Proxy server flattening the canonical record into IP addresses and optionally sub records depending on the length of the flattened response.

2. The method of claim 1, further comprising the step of:
    the SPF Proxy server returning the flattened record which includes an optional sub-record.

3. The method of claim 1, further comprising the step of:
    the receiving email server making additional requests to one or more sub-records depending on whether an already retrieved flattened record contains the IP address of the sending server.

4. A method for optimizing and preventing failure of Sender Policy Framework (SPF) lookups by dynamically generating and returning flattened SPF records, recorded on computer-readable medium and capable of execution by a computer, the method comprising the steps of:
    sending an email from a first sending mail server that purports to be from a first domain to a second, receiving email server that purports to be from a second domain;
    the receiving email server attempts to do an SPF validation using the sending email server's SPF record;
    the receiving email server does a DNS request for TXT from the sending email server;
    the sending email server DNS responds with an SPF Proxy Record;
    the receiving email server makes a request to a SPF Proxy server for the included domains SPF proxy record;
    the SPF Proxy server receives the request and extracts the domain name and optional sub record identifiers;
    the SPF Proxy server looks up a Canonical SPF Record from the sending domain's DNS server by making a request, wherein a lookup limit is circumvented by allowing the administrator of the sending email server to create a secondary SPF record that includes all the desired SPF records even if it exceeds 10 recursive lookups;
    the SPF Proxy server now flattens the canonical SPF record down into IP address and responds with the flattened records.

5. The method of claim 4, wherein
    the email is sent from the first domain's email server or from one or more third party email providers providing email service to the first domain.

6. The method of claim 4, further comprising the step of generating a canonical record by an optional or required "selector" contained within the Proxy Record; and
    the SPF records are static.

7. The method of claim 4, wherein
    the SPF Proxy server now flattens the canonical SPF record down into ip address and sub address and responds with the flattened records.

8. The method of claim 7, wherein
    there can be a plurality of sub-records; and
    the SPF Proxy server responds with a first flattened record in an array of records and sub-records.

9. The method of claim 4, further comprising the step of
    the receiving email server makes a request for a sub-record when the IP address of the sending email server is not in the list of flattened IP blocks that have been returned to that point.

10. The method of claim 1, wherein the administrator creates or modifies the main SPF record for the sending email server to include an entry that points to the SPF Proxy.

* * * * *